United States Patent Office
3,697,400
Patented Oct. 10, 1972

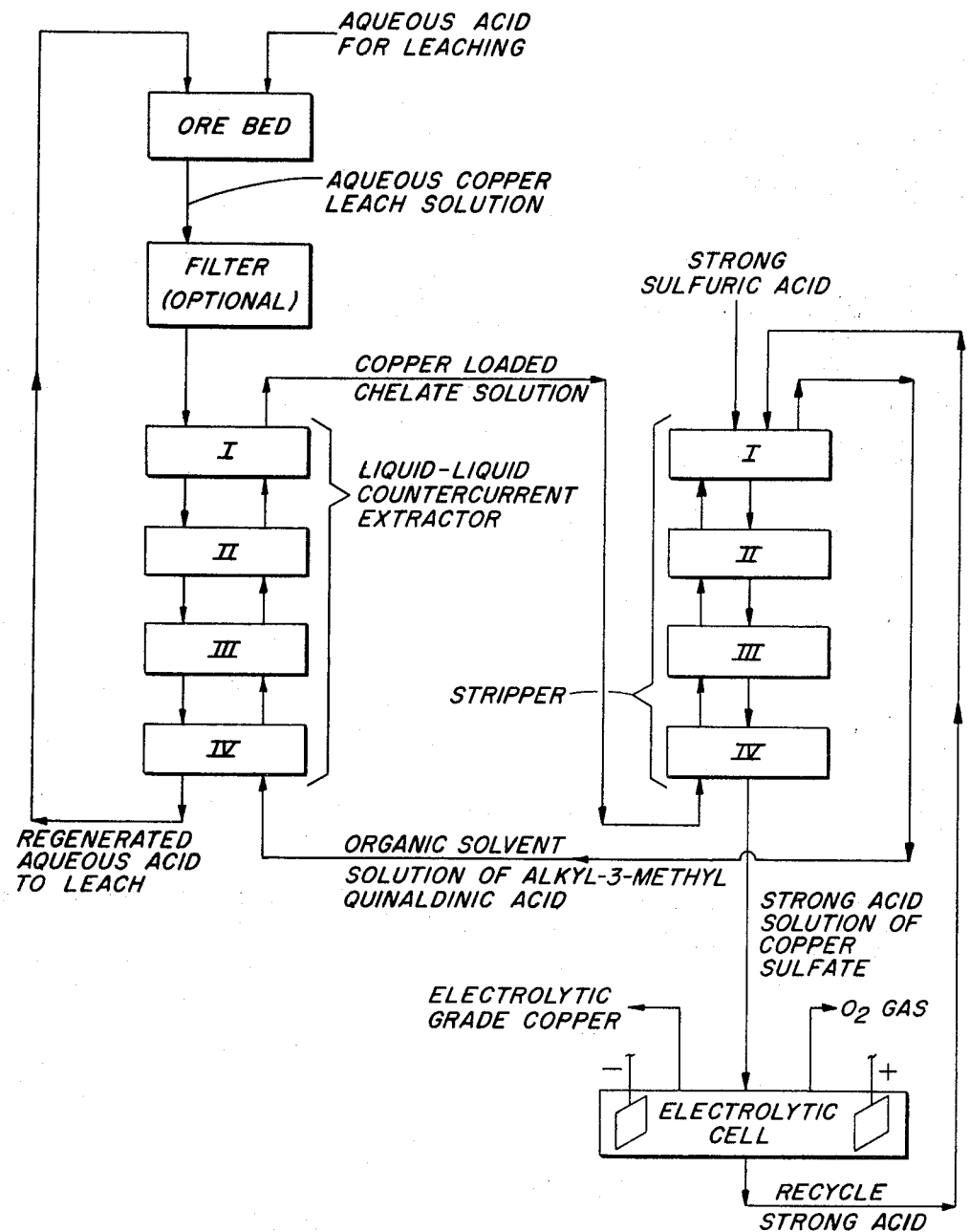

3,697,400
RECOVERING METALS BY EXTRACTION WITH A QUINALDINIC ACID AND ELECTROWINNING FROM THE STRIPPED CHELATE
Michael Pang, Stamford, Conn., assignor to American Cyanamid Company, Stamford, Conn.
Filed Feb. 17, 1971, Ser. No. 116,065
Int. Cl. C22d 1/16; C22b 3/00, 15/00
U.S. Cl. 204—106                     5 Claims

ABSTRACT OF THE DISCLOSURE

Copper is recovered from ores, or slags, or tailing piles, in which the cupriferous material is finally subdivided by leaching with a dilute aqueous acidic leach solution, the leach solution separated from insolubles, and the copper extracted using as extractant an alkyl-3-methylquinaldinic acid, the alkyl group being from 6 to 25 carbon atoms, such as 6-dodecyl-3-methylquinaldinic acid, in an organic solvent system, such as 75/25 kerosene/ aromatic petroleum fraction and which may contain up to 25% of a $C_9$ to $C_{14}$ alkanol, the organic extractant in solution separated from the aqueous leach solution, and the copper stripped from the organic extractant by strong sulfuric acid, the copper being stripped as copper sulfate in acid solution, from which copper is recovered as electrolytic grade copper by electrolysis.

New quinaldinic acids and methods of synthesis are disclosed.

BRIEF SUMMARY

This invention relates to the treatment of copper-containing ores and ore fractions, including slags, particularly processes in which copper is leached by aqueous acid, particularly sulfuric, and is extracted from the acidic aqueous leach solution with an oil-soluble, water-insoluble long chain alkyl-3-methylquinaldinic acid dissolved in a water-insoluble organic solvent, and more particularly in which the raffinate from the extraction is recycled to leaching, and the extract is stripped of the copper with more concentrated aqueous acid, with recycling of the organic solvent containing such long chain alkyl-3-methylquinaldinic acids, and to methods of making such acids, and the said quinaldinic acids themselves.

At present copper sells at about 45 to 50 cents per pound.

Even though the value per pound of the long chain alkyl-3-methylquinaldinic acid is considerably greater than that of the copper, losses during the processing are kept minimal, with a very economical overall cost of recovery as compared with other known methods of copper beneficiation.

Solvent extraction for copper recovery is described in Lower, U.S. Pat. 3,429,694 Recovery of Copper and Cyanide From Solutions Thereof by Solvent Extraction. Recovery by solvent extraction from acid circuits is generalized in Cahalan, Solvent Extraction of Copper Recovery—Some General Considerations, Chemistry and Industry, 610 (Apr. 15, 1967). Chem. & Eng. News, Apr. 17, 1967 Ion Exchange Recovery of Copper Promising, mentions certain oximes as extractants, as does U.S. Pat. 3,224,873, Swanson, Liquid-Liquid Recovery of Copper Values Using α-Hydroxy Oximes. Netherlands patent application 6,610,314 (priority claimed of U.S. Ser. No. 432,903 of Feb. 15, 1965) discloses other hydroxybenzophenoximes in solvent extraction of copper.

Advantageously, the present long chain alkyl-3-methylquinaldinic acids may be used to replace such extractants, and can be used mixed therewith. That is the said quinaldinic acids can be added to the extraction circuit as a make-up extractant, and phased in, as such other extractants are gradually removed by process losses. Thus the new extractant is phased to in while inventories of the replaced extractant are utilized as available without the necessity to waste or discard such replaced extractant. That is the extractant can be changed gradually during continuous operation.

Quinaldinic acids have been described; for instance Majumdar, Quinaldinic Acid as a Reagent for the Separation and Determination of Copper and Cadium, Analyst, 64, 874 to 876 (1939) shows quinaldinic acid as an analytical reagent. Pertinent references are cited.

Popp, Reissert Compounds, Advances in Heterocyclic Chemistry, vol. 9, Academic Press, New York (1968) is a review article with 63 references, mentioning among other methods, certain syntheses of quinaldinic type compounds.

Where not otherwise limited by context, the term "ore fraction" is intended to include the ores themselves, in place or as mined, crushed or ground to treatable size, both rich and lean, as well as selected portions such as fines or slimes from any of the grinding operations, before or after flotation, sands or any sands fractions of any size in which the reduction of ore particles is small enough that an economic fraction of the copper-containing minerals are exposed to action by reagents, also cleaner tailings, rougher tailings, rougher concentrates, cleaner concentrates, and slags, including converter slags and reverberatory slags. With slags, grinding or other methods of attrition may be necessary in order that the subdivision be fine enough to permit attack on the individual copper-bearing particles by acid solution.

The ore fraction may contain both sands and slimes. The slimes are the finely-divided, difficultly-filterable particles, which frequently are difficult to handle because of the large surface to weight ratio. Sands are larger particles, usually from a classification step, frequently using a cyclone, and are more amenable to flotation. Hence, circuits are useful in which the slimes are treated directly with acid leaching, and the sands are floated, with part or all of the concentrate sent to the smelter as in conventional processing, and with part of the tailings, or cleaner tailings being treated by acid leaching.

Ores may be leached in place without mining by injecting water and/or acids such as sulfuric into copperbearing formations. The resulting acidic copper-bearing solutions are collected by various methods and are treated by the extractants of this invention. Copper-bearing mine waters also may be so treated.

The economics of leaching of each copperbearing ore or ore fraction may be separately considered. The preferred circuit varies with the type of ore treated, the richness of ore, and cost and availability of water, acid, the organic solvent and the long chain alkyl-3-methylquinaldinic acid extractant. The most economical circuit for a specific ore or ore fraction can be chosen using the principles set forth herein as applied to the conditions that prevail at a specific ore processing operation.

The present process gives best results with oxide ores, and ores that are easily oxidized.

One very useful process is to leach tailing piles with dilute sulfuric acid, with the aid of bacterial action, and by percolation of acid through the tailing piles. The process may take years. More rapid leaching is sometimes preferred as in vat leaching or by agitating the ore fraction in acidic solution.

Acid extraction is useful in flow sheets in which sulfide copper is floated, and residual oxide copper is acid leached, as well as in processes in which sulfides are oxidized to the copper oxides by roasting, or slow oxidation at ambient temperatures. Some forms of sulfide copper are dissolved in dilute acids at rates which are attractive, without further treatment. Bacterial action aids the leaching operations.

As used herein, the term "sulfide ores" includes those containing the more common sulfide minerals, such as chalcocite ($Cu_2S$), digenite ($Cu_9S_5$), and covellite (CuS), as well as mixed sulfides such as bornite ($Cu_5FeS_4$), enargite ($Cu_3AsS_4$), and tetrahedrite ($Cu_{12}Sb_4S_{13}$). Chalcopyrite also may be present.

The term "oxide ores" is used to cover the ores in which the copper occurs as an oxide or carbonate such as azurite ($CuCO_3 \cdot Cu(OH)_2$), malachite $$Cu_2(OH)_2CO_3$$

cuprite ($Cu_2O$), tenorite (CuO), and forms of chrysocolla, which is a silicate mineral of copper.

The term "mixed ores" is used to cover ores in which the copper occurs as both sulfide minerals and oxide minerals and the proportion of each is large enough that for reasonable economic recovery both types of copper minerals need to be considered in the treatment. Sulfide ores which are completely free from oxide, or oxide ores which are completely free from sulfides are unusual. Ores exist in which the proportion of oxides in a sulfide ore or sulfide in oxide ore is so low that for metallurgical recovery purposes the ore may be considered as essentially the sulfide or an oxide type. Similarly, in working with slags the same classification can be used and in working with ore fractions the same terminology is applicable.

Similarly, scrap metal, or metal containing industrial waste products may contain enough acid soluble copper that recovery of the copper is economical, such scrap or metal may be considered an ore for present purposes.

The acid in which the copper is dissolved, called the leach acid, is usually a dilute sulfuric acid, not necessarily pure. Other low cost acids, such as hydrochloric acid, or nitric acid can be used. Because sulfuric acid is usually lowest in cost, sulfuric acid is the leaching acid of choice. As described below, part of the acid may be recycled to the process, and part or all of the acid can be produced in ore processing. For example, sulfide ores may be roasted and the sulfur recovered as sulfur dioxide or converted to sulfuric acid, and the acid as so recovered may be used for leaching ore fractions.

Particularly in leaching ore piles such as tailing dumps, and overburden containing low copper values, the rapidity of leaching is not important, and slow percolation of dilute acid over a period of months or years gives good results. For such slow leaching, a dilute acid at a pH of 1 to 6 gives good extraction. More concentrated acid solutions give faster leaching. A warmer leaching acid extracts the copper more rapidly, and has lower viscosity, but usually the leaching is carried out at ambient temperatures, without added heat. Such temperatures can be from just above freezing to over 100° F. (38° C.) during the summer or in the tropics.

The organic phase for the extraction must be water insoluble and preferably very insoluble to reduce losses. The solubility in water at 25° C. should be below about 0.1% and preferably below 100 parts per million to reduce losses in the aqueous phase being extracted. A fraction which is more soluble may be used if available at a price that makes losses, including losses of the said quinaldinic acid, acceptable. The specific gravity needs to be different from the aqueous phase to permit fast phase splitting. Theoretically, a fraction heavier than water can be used, but economically present prices dictate solvents lighter than water. A specific gravity of less than 0.9 is preferred for fast separation; even lower gives faster separation. The organic phase should be a liquid at the temperature of operations and for economic operations must be low in cost.

Theoretically, liquid aliphatic hydrocarbons, pure or mixed, including cycloaliphatic hydrocarbons and aromatic hydrocarbons, including arylalkyls are satisfactory. Chlorinated or other halogenated comparable solvents may be present in the solvent.

From cost considerations aliphatic fractions from petroleum distillation, such as kerosene, are most advantageous. Monocyclic aromatic fractions, such as benzene, mixed xylenes, and toluene, and petroleum fractions containing some proportions thereof give improved solubility to the long chain quinaldinic acid and its copper chelates. Fuel oils are often advantageous commercially. If more volatile than kerosene, the flammability and loss by volatilization becomes high and if much higher boiling than the kerosene range, the viscosity becomes high and, hence, disadvantageous. Among the aromatics, aromatic fractions from petroleum distillation, are economically advantageous. Preferably fractions are used with a flash point above operating temperatures.

These materials are available under such trade names as Varsol, Solvesso, etc. Pure materials give excellent results but the choice is usually the cheapest available organic solvent, usually a mixture and not particularly pure, often a petroleum fraction of mixed aliphatic and aromatic compounds. A solvent of low flammability is preferred to avoid fire hazards. Kerosene has a boiling point of about 150° C. to 300° C. which is a boiling point high enough to keep evaporation losses within reasonable limits. The aromatic petroleum fractions in the same boiling point range are versatile and useful when available at a competitive price.

A mixture of kerosene and an aromatic petroleum fraction is both effective and economical. From the standpoint of extraction efficiency, benzene, toluene and low boiling kerosene is very effective but may be a fire hazard.

Commercially available aromatic petroleum fractions with a flash point of over about 125° F. (52° C.) are better from the fire hazard viewpoint. In general, the flash point of the solvent system in use should be at least 100° F. (38° C.) and preferably 125° F. (52° C.).

Ethyl ether is an excellent solvent for the organic extractant, and but for the fire hazard could be used advantageously. Because ethyl ether is so very flammable, its use in large scale commercial operations is avoided.

An intermediate chain length alkanol, that is one with from about 9 to 14 carbons in the alkanol, and commercial mixtures thereof aid in keeping the long chain alkyl-3-methylquinaldinic acid and its chelates in solution. Up to 25% by weight can be used. Usually from about 5% to 10% aids in solubilization, at lowest costs. Decanol with a flash point of about 356° F. (180° C.) is available in commercial grades and is used advantageously. Isodecanol and dodecanol are also commercially competitively priced and useful.

Optimum operating conditions vary with various ores, leach acids, copper concentrations, and long chain alkyl-3-methylquinaldinic acid concentrations.

The organic extractant and its copper chelates must be soluble in the organic carrier solvent. The water solubility of the organic extractant and its copper chelates should be less than about 50 parts per million and preferably less than about 10 parts per million, to avoid undue losses.

The organic extractant should be non-emulsion forming so as to allow rapid and clear phase separation of the organic layer from the aqueous layer. Phase separation times of less than 5 minutes are desirable but under certain conditions longer times may be tolerated depending on local conditions, including tonnage throughput and the nature and size of extracting equipment available. A centrifuge aids in removing the smaller particles of the organic solvent rapidly.

One of the classic reactions for organic chemistry is the Skraup synthesis in which aniline is heated with glycerol and nitrobenzene in the presence of sulfuric acid to yield quinoline.

To prepare the extractants of this invention, substituted anilines in which there are one or more alkyl groups in the 3, 4, or 5 positions are reacted under similar conditions to yield substituted quinolines.

Instead of glycerol, methacrolein, also called α-methacrolein or 2-methylpropenal,

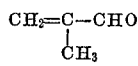

or its diacetate, methallylidene diacetate

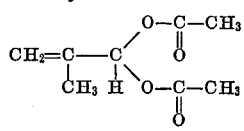

which under these conditions behaves as the aldehyde, is used, and a 3-methyl quinoline is obtained.

Depending upon the size of the vessel, heat may be generated so vigorously that external cooling is required to maintain the temperature at that desired, or in other conditions the heat losses from the equipment will be such that heat must be added.

Conveniently the acid is put in the reactor and a mixture of the substituted aniline, methacrolein or methalkylidene diacetate and nitrobenzene added thereto with stirring. The vigor of the reaction depends in part upon the substitutents on the aniline and may occur from near room temperature to around 135° C. Frequently it is convenient to add the reactants at below 100° C. preferably around 60° to 90° C. and then heat to between 120° and 140° C. to complete the reaction. After the reaction, the residual nitrobenzene is removed as for example by steam distillation, additional water added and the aqueous layer discarded. The organic product may be washed with caustic to neutralize any residual acid.

The conditions described are unique to the preparation of long chain alkyl-3-methylquinolines. In the original Skraup synthesis, concentrated sulfuric acid (96%) is added slowly to a mixture of aniline, nitrobenzene, glycerol, boric acid and ferrous sulfate. When this procedure is employed with long chain alkyl anilines, the reaction mixture gels during the sulfuric acid addition. This gelation presents mechanical stirring problems and may result in a hazardous condition, particularly in large scale operation, in which it is difficult to control the highly exothermic Skraup reaction. These difficulties are prevented by reversing the order of addition and by using 80–85% sulfuric acid, preferably about 82%. These conditions avoid gel formation. The synthesis can be carried out smoothly by adding alkyl aniline, and then a mixture of nitrobenzene, methacrolein or methalkylidene diacetate to 82% sulfuric acid.

The alkyl-3-methylquinoline is dissolved in a solvent such as methylene chloride or other inert solvent and stirred with an aqueous solution of sodium or potassium cyanide. To the stirred mixture is added benzoyl chloride. This is a classic Reissert reaction. The cyanide adds to the 2 position while the benzoyl group adds to the nitrogen. The benzoyl group subsequently splits out as benzaldehyde. After this reaction is completed, the reactor may be cooled, the mixture stirred with water and the aqueous layer separated and discarded. To the organic layer is then added concentrated hydrochloric acid slowly at about room temperature, followed by heating to 75–90° C. for 1–4 hours to effect hydrolysis of the nitrile to a carboxylic acid group. The product alkyl-3-methylquinaldinic acid can be separated by distilling off the benzaldehyde by steam distillation, discarding the aqueous layer, dissolving the thus formed quinaldinic acid in a solvent such as hexane, washing with caustic, then acid, and then water to obtain the said quinaldinic acid.

The product alkyl-3-methylquinaldinic acid can also be conveniently isolated by steam distilling the hydrochloric acid-organic layer which effects the hydrolysis reaction and the removal of benzaldehyde simultaneously. This one-step process has the additional advantage over the two-step heating-distilling process of minimizing the formation of by-product benzoin.

The sum totals of the carbons in the 3, 4, and 5 positions of the aniline should be between about 6 and about 30. The alkyl groups can be branched and but for cost considerations could have substituents such as chlorine or alkoxy groups thereon. Any groups which do not impair the oil solubility and are inert under the conditions of extraction of copper are acceptable but from cost considerations it is usual to have only the 6 to 30 carbon alkyl substituents.

The reactions may be illustrated by the following equations:

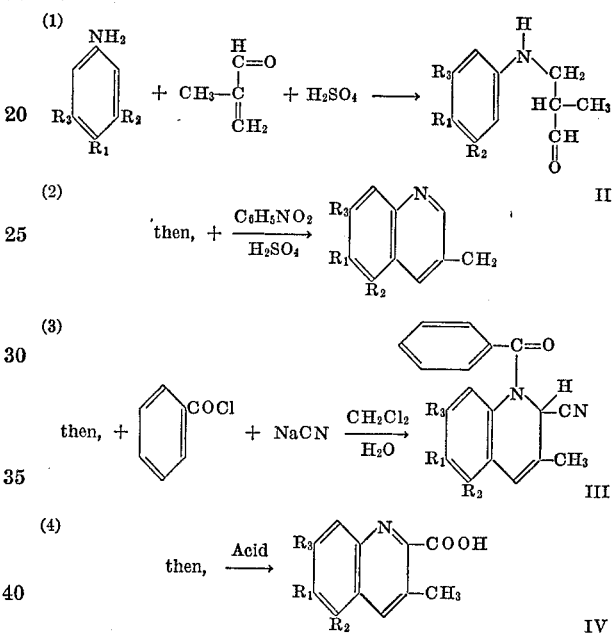

As is obvious, the long chain alkyl-3-methylquinaldinic acid can be a mixture of alkyl-3-methylquinaldinic acids. A convenient starting material for commercial syntheses is a technical or crude grade of p-dodecylaniline. As commercially available this material has a plurality of different alkyl groups in the para position ranging from about 6 to 18 with an average of about 12. Some of the commercial grades have at least 50% of dodecylaniline in the technical grade. A pure compound, or a mixture of pure compounds may be used, but as cost considerations in copper refining are extremely important, the lower cost technical grades are normally used and are a mixture of various p-alkyl anilines. The chelating ability is a molar function and hence the larger the alkyl groups, the lower the chelating capacity per pound of the long chain quinaldinic acids; on the other hand the introduction of additional alkyl groups appears to aid solubility in the oil phases. An effective compromise occurs at about the p-dodecyl quinaldinic acid and hence, because of this and the commercially availability of the technical grade p-dodecyl aniline as a starting material, such material is usually the starting material of choice.

DRAWINGS

A flow sheet of the extraction appears in the attached drawing. As the drawing shows, an ore bed is leached with aqueous acid. Sulfuric acid is usually the cheapest and, therefore, the acid of choice. The ore bed may be tailing piles or it may be overburden or any of the various forms in which copper-bearing ores occur. The use of leach tanks is successful, but it is also convenient to use piles of ore material with the sulfuric acid being added at a slow rate, percolating through and dissolving the copper.

Copper oxide ores are more readily dissolved than the sulfide ores, but bacteria and ambient atmospheric oxygen tend to aid oxidation of sulfide ores to facilitate leaching. Some of the sulfides are themselves soluble in acids. When the extraction is from an ore bed which is leached by percolation, extended periods of years may be used for the leaching and hence slow oxidation is satisfactory. Strong acids leach more rapidly, but on the other hand, strong acids are more expensive, so that acids at a pH from around 1 to 5 are frequently used for leaching.

The aqueous copper leach solution may be filtered if there are fines present, and then fed to a liquid-liquid extractor in which the copper is extracted as a chelate of the alkyl-3-methylquinaldinic acid dissolved in the solvent phase. A counter current extractor is preferred in order that the fresh organic solvent containing the said quinaldinic acid extracts from the acid solution having the lowest copper and as the copper loading of the organic phase increases it comes in contact with the fresher and hence higher copper concentrations in the aqueous acid leach liquor. As said quinaldinic acid forms a chelate with the copper, protons are released and these, together with the sulfate ions or other anions in the leach solution remain in such solution and reform the acid so that the leach solution becomes more acidic, and the regenerated aqueous acid may again be recirculated to leach additional ore. More dilute acids are used on the lower grade ore beds and wash water may be used to recover some of the acid from the ore beds. Depending upon the water content of the ore beds in which initial leaching occurs, ambient rainfall and other conditions, the total circulating acid may build up and if a build up occurs, the more dilute acids containing a minimum of copper may be discarded.

The copper loaded chelate solution is passed to a second liquid-liquid extraction system which is also a counter current type in which a strong acid, such as about 15–20% or stronger sulfuric acid is introduced counter-current to the copper loaded chelate solution with appropriate mixing to insure agitation and hence stripping. The strong acid dissolves the copper as copper sulfate and is passed to an electrolytic cell. The copper sulfate is electrolyzed, regenerating sulfuric acid and yielding an electrolytic grade of copper. The acid produced by the electrolytic cell is recycled with additional make-up acid added as required to the stripping column.

Normally the organic phase is adequately separated in the counter current stripping system but if complete separation does not occur, an additional amount of organic solvent can be added and the organic solvent used as a wash to protect against loss of the long chain alkyl-3-methylquinaldinic acid which is the most expensive component of the recovery system.

Filters or centrifuges and flotation equipment may be used to aid in a highly effective recovery of the organic phase. The ratio of the said quinaldinic acid, hereafter in part abbreviated AMQA in the solvent phase may be from less than about 1% to more than 20%. It is desirable that the quantity of the AMQA be less than that soluble in the solvent to avoid possible losses, and around 5% is frequently an economic maximum. The AMQA and its copper chelate must be soluble in the solvent under the conditions of use. If the extraction is made in very cold weather, the concentration may be less than when the temperature is higher.

The total volume of AMQA loaded organic solvent needs to be such that the chelating ability of the AMQA is sufficient to remove all of the copper in the copper leach solution. Depending upon the copper concentration, this can be from around 25% of the volume of the leach solution or if the copper load is low it may be down to 5% or 1% or less. The counter current extraction system permits effective loading with a high percentage of the theoretical copper content based on the AMQA content.

The copper is extracted from the copper containing solvent phase by sulfuric acid preferably at least about 15–20% and which may run up to 50% or more. Around 20 to 30% gives good results and is a good feed for an electrolytic cell in which the copper is recovered by electolysis.

AMQA is selective toward copper and leaves iron and many other contaminants relatively unextracted in the leach solution. Both the specificity towards copper and the high recovery of AMQA insure an economical process for the extraction of copper.

Frequently, it is desirable to float sulfide copper from an ore and treat the trail or other low-grade materials, by an acid leach. This reduces the volume of circulating acid leach solution and the AMQA in organic solvent circulating load. If the ore is roasted, all of the copper may be effectively recovered by the AMQA organic solvent extraction of the acidic leach solution.

By way of illustration but not limitation, the invention is set forth in the following examples in which all parts are by weight and temperatures centigrade unless clearly otherwise stated:

EXAMPLE 1

Preparation of 6-dodecyl-3-methylquinoline

Mix 106 g. (1.1 mole) of concentrated HCl (12.3 N) with efficient mechanical stirrer, thermometer, addition funnel and a thermometer. Add 130.7 g. (0.5 mole) of p-dodecylaniline slowly. Agitate rapidly and when the reaction mixture turns opaque, charge 10 g. (0.081 mole) of nitrobenzene. Raise the reaction temperature to about 80° C. Feed in carefully a mixture of 52.5 g. (0.75 mole) of methacrolein and 51.5 g. (0.419 mole) of nitrobenzene at a rate such that the reaction temperature rises to and remains at 100–105° C. After about ⅔ of the mixture is added, charge 1 g. of $FeSO_4 \cdot 7H_2O$. After the addition, maintain the reaction for 2 hours at about 100° C. Reverse and incline the condenser and pass steam into the reaction mixture until the distillate is free from nitrobenzene; then transfer reaction mixture into a separatory funnel. Drain off and discard the lower aqueous layer. Wash with 400 ml. of 10% sodium hydroxide and then with two 100 ml. aliquots of hot water. Add 100 ml. of ether and dry the ethereal solution with 50 g. of anhydrous sodium sulfate. Remove the ether by means of vacuum. A yield of 156 g. of crude product is obtained. Vacuum distillation gives 106 g. of purified 6-dodecyl-3-methylquinoline.

EXAMPLE 2

Preparation of 6-dodecyl-3-methylquinoline

Dilute 183.5 g. (1.8 moles) of concentrated $H_2SO_4$ with 24.5 g. of water in a 500 ml. reactor equipped with a mechanical stirrer, thermometer, addition funnel and condenser. Add 130.7 g. (0.5 mole) of p-dodecylaniline slowly. Then add 36.9 g. (0.3 mole) of nitrobenzene and 2.5 g. of $FeSO_4 \cdot 7H_2O$. Adjust the reaction mixture to 70° C. and slowly add 52.5 g. (0.75 mole) of methacrolein. After 13 g. of methacrolein is added, raise the reaction temperature to 90° C. by an external steam bath. Carefully add the remainder of the methacrolein at a rate such that the reaction temperature remains about at 100° C. The addition of methacrolein may take about 30 minutes. Allow the reaction mixture to stand overnight at ambient room temperature. Rearrange the condenser and steam distill out all of the unreacted nitrobenzene. The steam distillation takes about four hours. Transfer the reaction mixture to a separatory funnel, drain and discard the lower aqueous layer. Add about 40 ml. of ether and then wash thoroughly with 300 ml. of 13% caustic, then wash four times with 300 ml. aliquots each of 5% caustic. Dry the ethereal solution with about 50 g. of anhydrous $Na_2SO_4$, filter and allow the filtrate to evaporate in vacuo to remove the ether. The crude 6-dodecyl-3-methylquinoline (154 g.) is distilled in vacuum. Eighty-six grams of distilled product are obtained.

EXAMPLE 3

Preparation of 6-dodecyl-3-methylquinoline

Dilute 106 g. (1.1 moles) of concentrated HCl with 24 ml. of water in a 1 liter reactor. Agitate vigorously while adding 130.7 g. (0.5 mole) of p-dodecylaniline. Charge 24 g. (0.195 mole) of nitrobenzene, 2.5 g. of $FeSO_4 \cdot 7H_2O$ and 0.1 g. of $CuSO_4 \cdot 5H_2O$. Mix thoroughly and then add 38.5 g. (0.5 mole) of methacrolein. Maintain the reaction temperature at 40° C. during the addition of methacrolein. Then raise the temperature to 60° C. Add 47 g. (0.382 mole) of nitrobenzene. After the addition raise the reaction temperature to 100° C. and allow to react for 2 hours. Rearrange the reflux condenser and steam distill out all unreacted nitrobenzene. Transfer the mixture to a separatory funnel, and drain and discard the lower aqueous layer. Mix in 200 ml. of benzene and 100 ml. of ether. Wash with 200 ml. of 20% caustic. Wash twice with 200 ml. aliquots each of water. Stir the product with 100 g. of anhydrous $Na_2SO_4$ and 2 g. of decolorizing carbon and then filter. The filtrate is vacuum stripped to remove solvents. The crude product obtained (138 g.) is vacuum distilled to yield 70 g. of pure 6-dodecyl-3-methylquinoline.

EXAMPLE 4

Preparation of 6-dodecyl-3-methylquinoline

In a 2 liter reactor, dilute 276 g. (2.7 moles) of concentrated sulfuric acid with 47 g. of water. While stirring vigorously, add 195.5 g. (0.75 mole) of p-dodecylaniline and follow by 10 g. (0.081 mole) of nitrobenzene, all at about 40–80° C. Raise the temperature to about 100° C., and add a mixture consisting of 45 g. (0.366 mole) of nitrobenzene and 146 g. (0.85 mole) of methallylidene diacetate. Add slowly to avoid a sudden increase of temperature because of the exothermic reaction. 184 g. of concentrated $H_2SO_4$ and 30 ml. of water is mixed and added. After the complete removal of unreacted nitrobenzene by steam distillation, the product is suction filtered through course fritted glass. The bottom aqueous layer is discarded. The top oily layer is then washed once with 500 ml. of 10% sodium hydroxide and twice with 400 ml. aliquots of water. A yield of 228 g. of crude 6-dodecyl-3-methylquinoline is isolated.

EXAMPLE 5

Preparation of 6-dodecyl-3-methylquinaldinic acid

Mix 31.15 g. (0.1 mole) of 6-dodecyl-3-methylquinoline with 75 ml. of methylene chloride, and 9.1 g. (0.140 mole) of potassium cyanide in 12 ml. of water in a 500 ml. reactor. Stir the mixture vigorously, and then add a solution containing 25.2 g. (0.179 mole) of benzoyl chloride in 25 ml. of methylene chloride slowly such that the exothermic reaction proceeds at 30° C. without cooling. After the addition continue the reaction for another two hours at 45° C. Add 75 ml. of concentrated HCl and steam distill the mixture until free from benzaldehyde. Remove the aqueous layer and add 50 ml. of 20% caustic. Repeat the steam distillation. Reacidify the above mixture with dilute HCl. Crude 6-dodecyl-3-methylquinaldinic acid (33.2 g.) is then isolated as an amorphous solid.

EXAMPLE 6

Preparation of AMQA

Mix 40 g. (0.128 mole) of 6-dodecyl-3-methylquinoline with 50 ml. of petroleum ether in a reactor. Dissolve 16.3 g. (0.25 mole) of potassium cyanide with 33 ml. of water and charge to the reactor. With vigorous stirring add a solution consisting of 35 g. (0.25 mole) of benzoyl chloride and 35 ml. of petroleum ether. Add at such a rate that the reaction temperature is about 34° C. without external heating. Raise the reaction temperature ot 40° C. and stir for 15 minutes. Wash the reaction mixture with 150 ml. of water, and discard the aqueous layer. Add 75 ml. of concentrated HCl and steam distill until the distillate is free from benzaldehyde. The organic fraction of the residue is separated and washed with two 100 ml. aliquots of 10% sodium hydroxide, then with two 100 ml. aliquots of water. A white suspension is formed which is separated out by centrifugation. Wash the solid once with 40 ml. of hexane. Dissolve the solid in 50 ml. of ethanol and then pour into 200 ml. of acidified water. Extract the mixture with n-hexane. Evaporation of n-hexane yields 27.5 g. of 6-dodecyl-3-methylquinaldinic acid.

EXAMPLE 7

Preparation of AMQA

Dissolve 15.58 g. (0.05 mole) of 6-dodecyl-3-methylquinoline in 35 ml. of methylene chloride in a 250 ml. reactor. Add a solution of 6.51 g. (0.1 mole) of potassium cyanide in 6.5 ml. of water. Stir rapidly and add 14.06 g. (0.1 mole) of benzoyl chloride dropwise. Stir for two hours at ambient room temperature. Add 40 ml. of concentrated HCl and steam distill until the distillate is free from benzaldehyde. Extract the residue with 250 g. of hexane. Wash the hexane twice with water. 16.2 g. of 6-dodecyl-3-methylquinaldinic acid is isolated by vacuum evaporation of the hexane.

EXAMPLE 8

Synthesis of 6-dodecyl-3-methylquinaldinic acid

Dilute 159 g. of concentrated HCl with 36 ml. of water in a 3 liter reactor. Stir rapidly and add 195 g. (0.75 mole) of p-dodecylaniline slowly. The reaction temperature increases owing to the exothermic reaction. When the mixture turns white or light yellow, add 15 g. (0.122 mole) of nitrobenzene. Raise the reaction temperature to 90° and then add a mixture consisting of 40 g. (0.325 mole) of nitrobenzene and 78 g. (1.12 moles) of freshly distilled methacrolein. Schedule the addition rate so that the reaction temperature is 96–100°. The addition takes about 1 hour. Allow the reaction to run for another one hour at 100°. Rearrange the condenser and steam distill the reaction mixture until the distillate is free from nitrobenzene. Transfer the residue into a separatory funnel and drain off the lower layer. Wash the viscous organic layer thoroughly with 400 ml. of 10% caustic. Drain and discard the caustic wash. If the wash becomes acidic to litmus, repeat the wash. Dissolve the viscous residue with 200 ml. of ether and then wash twice with 200 ml. aliquots each of water. Dry the ethereal solution with 100 g. of anhydrous $Na_2SO_4$. Filter and then evaporate the ether under reduced pressure. A dark and viscous product (235 g.) is isolated (theor. 234 g.). Vacuum distillation (150–190° at 0.1 mm.) with 0.5 g. of zinc dust gives 165 g. of viscous light yellow liquid (70.5% yield based on p-dodecylaniline) which is the 6-dodecyl-3-methylquinoline. Mix 155.7 g. (0.5 mole) of said 6-dodecyl-3-methylquinoline with 150 ml. of methylene chloride. Dissolve 48.7 g. (0.75 mole) of potassium cyanide in 50 ml. of water and then mix thoroughly with above. Stir the resultant mixture at moderate speed. Add, slowly, to the above a mixture of 105 g. (0.75 mole) of benzoyl chloride and 25 ml. of methylene chloride through an addition funnel. Schedule the addition rtae so that the reaction temperature is about 45°. The addition takes 45 minutes. Stir the reaction at ambient temperature for another 45 minutes. Transfer all of the liquid mixture into a separatory funnel and discard the upper aqueous layer. Mix the methylene chloride layer with 150 ml. of concentrated HCl and steam distill until the distillate is free of benzaldehyde. Dissolve the organic residue with 400 ml. of ether and wash three times with 200 ml. aliquots of 10% caustic. Evaporate the ether and redissolve the solid residue with 800 ml. of 90% methanol. Wash seven times with 100 ml. aliquots each of n-heptane. Add dilute HCl until the methanolic solution is acidic to litmus. Pour the methanolic solution into 2 liters of water to effect separation of an oily product. Extract the product with two 200 ml. portions of ether. Vacuum evaporation of ether from the extract yields 84.4 g. (53% based on 6-dodecyl-3-methylquinoline) of 6-dodecyl-3-methylquinalidinic acid.

EXAMPLE 9

A solution containing 1.3 grams of copper and 2.2 grams of iron per liter is obtained by the extraction of an ore sample with dilute sulfuric acid. The solution has a pH of about 2.0. Portions of this leach solution are extracted with an organic extractant consisting of kerosene (boiling point 150°–300° C.) containing 5% by weight of the product of Example 5.

In one test to illustrate the selectivity and loading capacity of the AMQA, equal portions of the leach solution and kerosene containing 5% AMQA were shaken together and the residual aqueous solution was analyzed for both copper and iron. The organic phase was shaken with 5 successive portions of the aqueous leach solution. The analyses were:

| Extraction | Copper concentration, grams/liter | | Iron concentration, grams/liter | |
|---|---|---|---|---|
| | Organic [1] | Aqueous | Organic [1] | Aqueous |
| 1st | 1.28 | 0.00 | 0.37 | 1.96 |
| 2nd | 2.51 | 0.05 | 0.14 | 2.56 |
| 3rd | 3.37 | 0.42 | 0.00 | 2.51 |
| 4th | 3.50 | 1.15 | 0.00 | 2.37 |
| 5th | 3.53 | 1.25 | 0.00 | 2.32 |

[1] By difference.

This extraction of the leach solution shows that the organic solution of 6-dodecyl-3-methylquinaldinic acid extracts copper from the aqueous solution at a highly preferential rate until the organic phase becomes well-loaded with copper. The figures on the iron concentration show that the AMQA does extract iron to some extent from the aqueous solution, and where the aqueous solution has substantially all of the copper extracted, iron is also extracted but as the organic solution becomes more heavily loaded with copper, additional copper replaces iron which has been chelated by the AMQA, and the aqueous phase is actually selectively reloaded with iron from the organic phase. Even if the chelate does contain some iron, copper is extracted and iron released to enrich the aqueous phase with iron, while copper is removed from the aqueous phase.

The loaded organic solutions were then stripped with 20% by weight sulfuric acid solution. Equal volumes of organic phase and 20% acid were used. Following are tables showing the concentration of copper and iron left in the organic solution after stripping with 2 successive portions of acid.

```
                                   Conc. of copper g./l.
                                    in organic phase
Initial _____ 3.53
1st strip _____ 0.73
```

In actual mining operations, the results are not as readily set forth in tabular form because the leach solution may be a fairly concentrated copper containing leach in a highly acid solution where a roasted ore is extracted with a fairly strong acid, down to an extremely dilute solution containing low quantities of both copper and iron. For example, the feed may be a naturally occuring stream or water taken from a mine, or a leach solution which has percolated through a tailing pile, or acid fed through a stripped over-burden which does not contain sufficient copper to warrant mining or ore processing through a normal mill circuit, but yet which contains sufficient copper that dilute acid leaches copper therefrom, over a long period of time. As copper is oxidized from the sulfides to the oxides by bacterial action and the acid percolates slowly through the piles of copper-containing over-burden a dilute leach solution containing copper is obtained. The copper leach solution can contain from less than ½ gram per liter to 10 or more grams per liter of carbons in the long chain alkyl side chain, but had species copper in the acidic aqueous phase. Usually a concentration of around 0.7 to 1.5 grams per liter of copper is closer to conventional practice. It is to be stressed that the present extractant is designed to work with such acidic copper containing streams as they are found and not necessarily at concentrations which have been adjusted for the convenience of the extraction system.

Similarly the extraction can be one that occurs in a matter of hours in a leach tank or one that occurs over a period of years in tailing dumps. The leach bed can be a naturally occurring canyon (or one in which an asphalt lining has been placed on the surface to give improved water impermeability) with an entire canyon filled; and the leaching occurring over a period of years through the entire canyon containing millions of tons of low copper content minerals.

Variations in the conditions of the leaching, the counter-current extraction, and the stripping are readily adjusted to maximize the economic recovery from particular ore beds which are available for processing at a particular time and place. Such variations are within the scope of the present invention.

The ratio of the weights of the extractant in the organic solvent, that is the AMQA in the water immiscible solvent phase, to the aqueous copper leach solution may vary widely. If the copper concentration is high, obviously a larger volume of the AMQA-solvent is required to extract the copper than if the copper concentration is comparatively low. The number of stages of counter current extraction varies with the type of equipment, and other flow sheet details. For conventional type extractors, from 3 to 9 stages normally can be considered as an economical range for either the AMQA-solvent extraction of the copper, or for the strong acid stripping of the copper from the copper loaded chelate to form the electrolytic cell feed. The ratio of weights of the aqueous acid leach to the AMQA-solvent in each stage is advantageously within the range of about 10:1 to 1:10—although plants can be operated outside of this range. The rate of flow of the solvent phase is not necessarily the same as the rate of flow as the aqueous acid leach solution introducing the copper. With more stages, a more completely copper loaded solvent phase, or strong acid phase is obtainable, but the cost of equipment is higher.

EXAMPLE 10

As illustrative and shown in the drawing, an ore bed consisting of the mine tailings from a copper mill was treated by slowly spraying on the surface a dilute sulfuric acid solution in part consisting of dilute sulfuric acid but mainly consisting of the extracted aqueous solution of leaching acid which penetrated slowly through the mine tailings, so that the leaching time was on the order of months. As the aqueous acid leaching solution, now containing copper, slowly drains from the bottom of the mine tailing, the solution is filtered to remove any solid particles, and then fed into a liquid counter-current extraction column in which the feed volume is such that approximately ⅓ as much solvent phase is present as aqueous phase, with the aqueous phase running through the system somewhat faster so that a major part of the copper is chelated with the 6-dodecyl-3-methylquinaldinic acid, dissolved at about 5% by weight in the solvent phase. The solvent is 25% kerosene, with the boiling point range starting at 150° C. and about 70% of a liquid aromatic petroleum fraction having a flash point of 150° F. and sold as "Solvesso 150," and 5% commercial grade isodecyl alcohol. The alcohol has from $C_9$ to $C_{14}$ components both branched and straight chain, but is predominantly isodecanol. The 6-dodecyl-3-methylquinaldinic acid is from a commercial grade of para-dodecylaniline which contained an average of about 12 varying from about $C_8$ to $C_{14}$ in the side chain.

The extraction is conducted at ambient mine temperature of about 65° F. with the extracted aqueous acid being recycled to the mine tailings and the copper loaded chelate organic solvent being cycled to the counter-current stripper to which 20% sulfuric acid plus recycled strong acid was fed. The extracted organic solution AMQA containing some copper which was not stripped is recycled to the aqueous acid leaching extractor and the strong acid solution containing copper sulfate is fed to an electrolytic cell, as shown in the drawing. The copper is separated as electrolytic grade copper, with oxygen being evolved at the other electrode. The electrolytic cell is of a conventional construction. To obtain higher current efficiency only around 40–50% of the copper is electrolyzed, with the rest remaining in the strong acid which is recycled to the counter-current stripping column.

Preferable operating embodiments in any one mill is in part controlled by the cost of electric power, cost of the various chemicals, and often varied to fit equipment which is already in the mill.

Those skilled in the art appreciate such interacting variants, and the fact that the ore bed can be any form of ore bed and frequently is varied in a single mine over a period operation.

The copper chelates of the present long chain alkyl-3-methylquinaldinic acids can be represented by the formula:

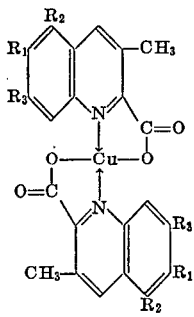

where $R_1$, $R_2$ and $R_3$ are each selected from the group consisting of hydrogen and an alkyl group, and the total number of carbons in said $R_1$, $R_2$ and $R_3$ is at least about 6, and not greater than about 30.

While the chelate formula appears to be a correct representation of the reaction product of copper and the long-chain alkyl-3-methylquinaldinic acids, other formulas or representations may be used—it is the material and not the formula that is effective, and any difference in the formula representing the material obviously has no effect on the compounds themselves.

I claim:
1. A process of recovering copper from aqueous acid leach solution containing ore body impurities which comprises:
  intimately mixing with an aqueous acid leach solution containing ore body impurities
  at least one water-insoluble, oil-soluble long chain quinaldinic acid having the formula

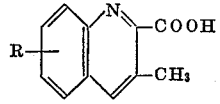

where R represents at least one alkyl group of a total of about 6 to about 25 carbon atoms, not necessarily straight chain, and attached in the 5 to 7 positions on the quinaldinic acid rings
  dissolved in a comparatively non-flammable water-immiscible organic solvent selected from the group consisting of liquid petroleum fractions, liquid monocyclic aromatic fractions, mixtures thereof, and not more than 25% of an intermediate chain alkanol
  extracting the copper as a copper chelate into the said organic solvent,
  separating the organic solvent,
  stripping the copper from said organic solvent with a highly acidic solution and electroplating the copper from said stripping solution.

2. The process of claim 1 in which the long chain quinaldinic acid is a 6-alkyl-3-methylquinaldinic acid with from about 6 to 20 carbon atoms in the alkyl group.

3. The process of claim 1 in which the long chain quinaldinic acid is 6-dodecyl-3-methylquinaldinic acid, of a commercially pure grade.

4. The process of claim 2 in which the stripped said organic solvent containing said long chain quinaldinic acid is recycled to the mixing step, and the said solvent is a mixture of kerosene, an aromatic petroleum fraction, and not more than 25% $C_9$ to $C_{14}$ alkanol.

5. The process of claim 4 in which the electrolyzed highly acidic solution is recycled to the stripping step.

References Cited
UNITED STATES PATENTS 3,637,476  1/1972  Pang _____ 204—106
3,637,711  1/1972  Budde et al. _____ 75—117

JOHN H. MACK, Primary Examiner
R. L. ANDREWS, Assistant Examiner

U.S. Cl. X.R.
75—101 BE, 117